United States Patent

[11] 3,593,516

[72] Inventor Franz R. Mayer
Altenfurt near Nuremberg, Germany
[21] Appl. No. 835,422
[22] Filed June 23, 1969
[45] Patented July 20, 1971
[73] Assignee Diehl
Nuremberg, Germany
[32] Priority June 21, 1968, May 3, 1969
[33] Germany
[31] P 17 73 678.0 and P 19 22 640.5

[54] MECHANICAL OSCILLATOR FOR TIME-
KEEPING DEVICES
7 Claims, 12 Drawing Figs.
[52] U.S. Cl.................................................. 58/23,
310/25
[51] Int. Cl........................................................ G04c 3/00
[50] Field of Search............................................ 58/23, 23
TF; 84/409, 457; 310/25

[56] References Cited
UNITED STATES PATENTS
3,462,939 8/1969 Tanaka et al. ................ 84/457

Primary Examiner—Richard B. Wilkinson
Assistant Examiner—Edith C. Simmons
Attorney—Walter Becker ABSTRACT: An oscillator in the form of a pair of parallel resilient arms joined at one end and free at the other end. The arms oscillate in counterphase and each has a mass element on the free end so disposed thereon as to counterbalance the torque about a line between the arms which is developed by oscillation of the arms.

At the free ends of the arms one thereof has associated therewith a driver for driving the arms, while the same, or the other arm, has a device thereon for imparting motion to a driven member, such as the input member for a clockwork.

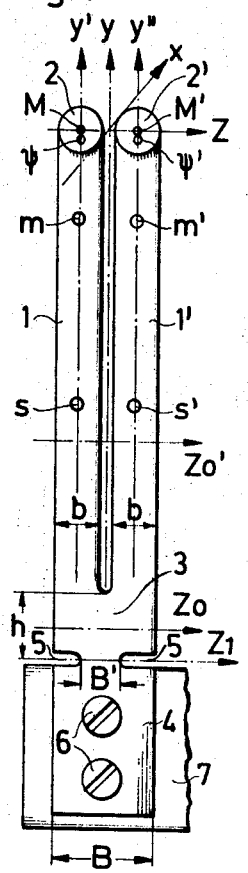
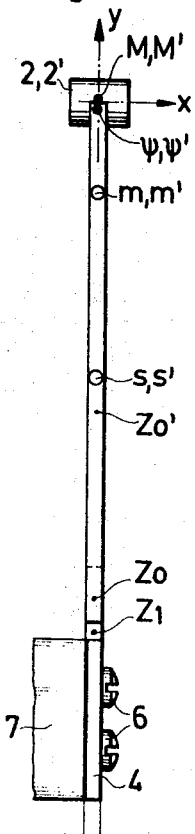
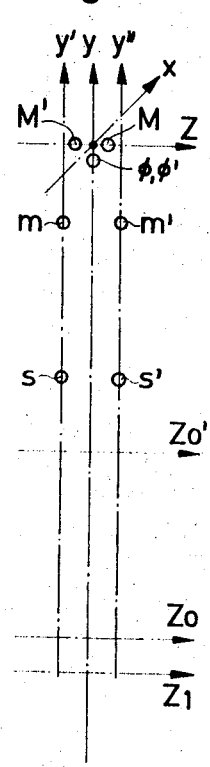
Fig. 1  Fig. 2  Fig. 3
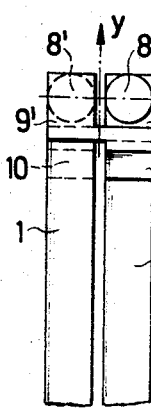
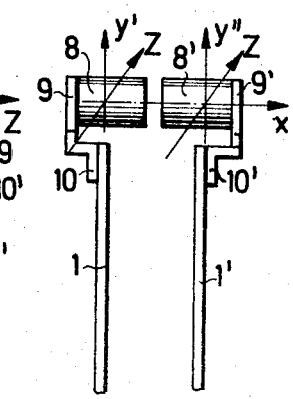
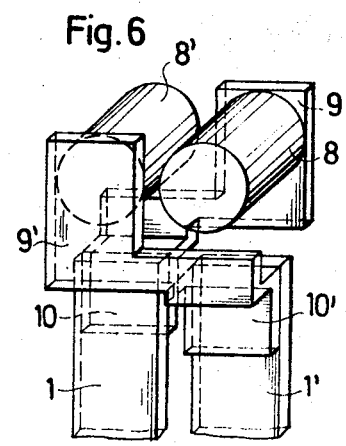
Fig. 4  Fig. 5  Fig. 6

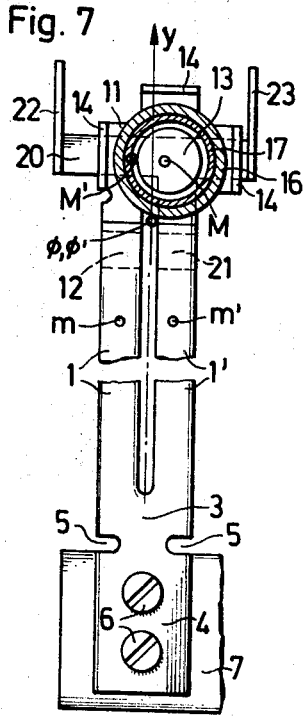
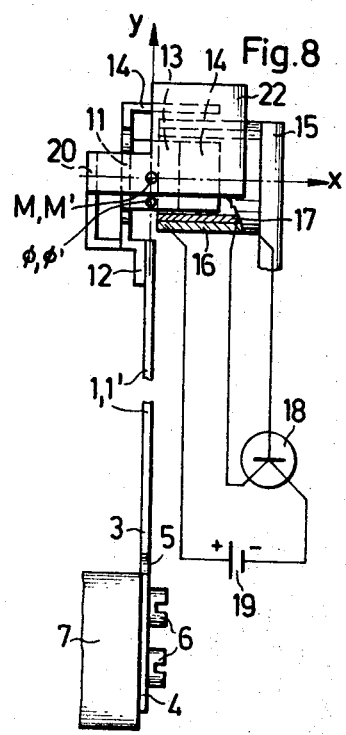
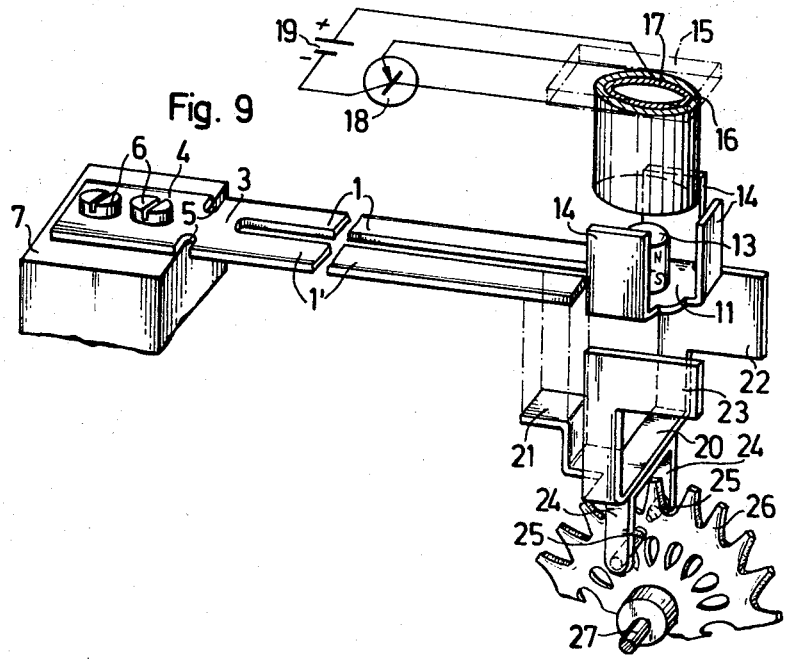

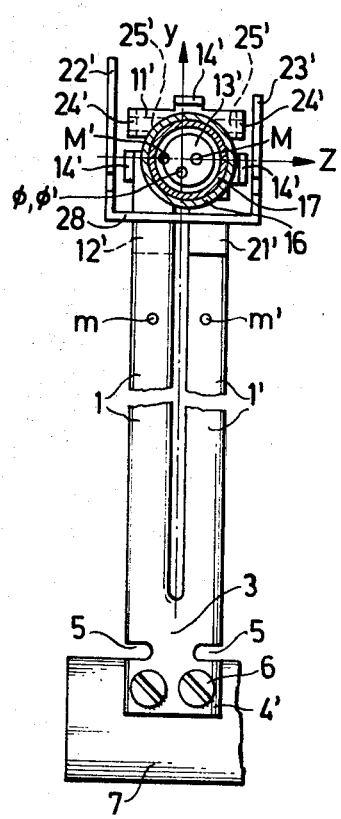
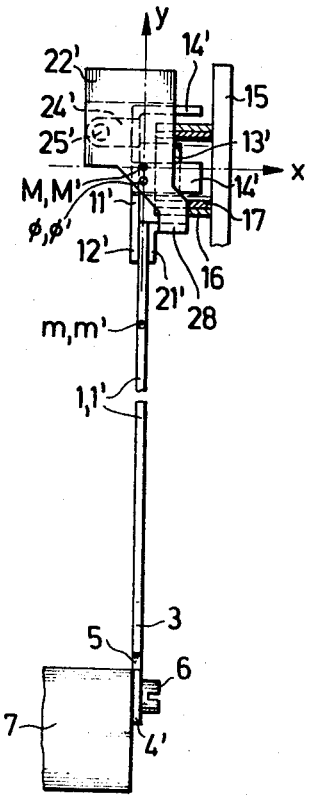
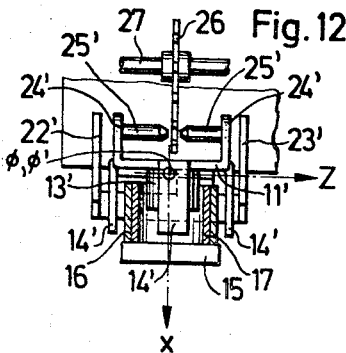

MECHANICAL OSCILLATOR FOR TIME-KEEPING DEVICES

The present invention relates to a mechanical oscillator adapted to be used as frequency standard for time-keeping devices, in which the oscillator part substantially absorbing the potential energy of the oscillator consists of a two-pronged flat longitudinal fork the arms of which are arranged adjacent to each other and preferably symmetrical to a second plane perpendicularly intersecting the first plane while the arms at one end are interconnected and provided with a connecting element whereas the other free end supports additional masses. The partial oscillators primarily composed of fork arm and additional mass are substantially identical so that in planes perpendicular to the first-mentioned plane they can be subjected to counterphase bending oscillations of the same frequency.

It is an object of the present invention to provide a mechanical oscillator of the above-mentioned type and, more specifically, to provide a simplified way of its production and to reduce the cost of its production.

It is another object of this invention to provide a mechanical oscillator as set forth in the preceding paragraph which will have improved properties with regard to its frequency standard.

These and other objects and advantages of the invention will appear more clearly from the following specification in connection with the accompanying drawings, in which:

FIG. 1 represents a two-arm fork oscillator according to the invention as seen in the direction of oscillation.

FIG. 2 is a side view of a fork oscillator seen in a direction perpendicular to FIG. 1.

FIG. 3 represents the diagram of a fork oscillator with an arrangement of additional masses in conformity with the invention, likewise seen in the direction of oscillation.

FIG. 4 shows the top portion of a compensated fork oscillator according to the invention likewise seen in the direction of oscillation.

FIG. 5 is a side view of the illustrated part of a compensated fork oscillator with fork arms arranged adjacent to each other and equipped with an additional mass.

FIG. 6 shows on a larger scale than FIGS. 4 and 5 the head portion of the compensated fork oscillator in perspective view.

FIG. 7 represents a first embodiment of a fork oscillator according to the invention as seen in oscillating direction with means for inducing an oscillation.

FIG. 8 is a side view of the fork oscillator of FIG. 7 with partially sectioned driving coil.

FIG. 9 illustrates in perspective view the fork oscillator of FIGS. 7 and 8 with the head portions shown pulled apart and with a device for driving an indicating mechanism.

FIGS. 10, 11 and 12 respectively illustrate in three views perpendicular to each other and partially in section a modification of the fork oscillator of FIGS. 7—9 with devices for inducing oscillations and for driving an indicating mechanism.

According to the present invention it is suggested that the additional masses which are connected to the free ends of the fork arms are with regard to their oscillating centers located on another side of the above-mentioned second plane than the oscillating centers of the fork arms connected to said masses. More specifically, the additional masses connected to the free ends of the fork arms are arranged at such a spacing that the torques exerted by the fork arms about the intersecting axis of the two mentioned planes will with each partial oscillator be compensated for by the torques exerted by the additional masses.

Referring now to the drawings and, more specifically, to FIGS. 1 and 2 thereof, the fork oscillator illustrated therein substantially comprises a plane flat two-arm fork which can be produced in a simple manner from band material of suitable thickness by punching or stamping. The said two-arm fork has two longitudinal spring arms 1, 1' which are separated from each other by a gap which is relatively narrow with regard to the width $b$ of the spring arms. The said spring arms 1, 1' have their upper ends provided with additional masses 2 and 2' whereas the lower ends of said spring arms 1, 1' are interconnected by means of a common foot 3 having a height substantially equaling the width of the fork. Adjacent to foot 3 there is provided a one-piece holding member 4 which is partially separated from the foot 3 by two symmetrical lateral cuts or grooves 5 having their bottoms rounded. The said holding member 4 is connected to the foot 3 by the intermediate portion or part having a width $B'$ substantially equaling the width of the fork $b$. The holding member 4 has two bores and is screwed onto a fixed support 7 by means of two screws 6.

The figures in the drawing have been provided with a coordinate system comprising the coordinates $x$, $y$, $Z$. From these coordinates it will be seen that the illustrated fork oscillator is symmetrical with regard to the $y, Z$-planes and is also symmetrical to the main plane of symmetry through the axes $x, y$. FIG. 1 also contains the central axes $y'$ and $y''$ of the fork arms 1, 1'. In view of the surfacelike shape, in other words in view of the slight extension in the $x$-direction, the two fork arms 1, 1' with the additional masses 2, 2' can relatively easily be caused to carry out oscillations in the $x$-direction while a possible oscillation of both fork arms with the same phase about the axis Z1 is to be left out of consideration.

As main oscillation, the counterphase oscillation of the two fork arms 1, 1' is to be considered according to which said arms 1, 1' carry out a bending oscillation in the $x$-direction. The masses of the fork arms 1, 1' and the additional masses 2, 2' rigidly connected to the ends of the fork arms take part in this oscillation. If $s$ and $s'$ represent the centers of gravity of the fork arms proper, these fork arms would without the additional masses carry out an oscillation the oscillation center of which would be located approximately at $m$ or $m'$. In this connection, the oscillation or inertia center is to mean that point in which the entire mass of the fork arms can be visualized as united during the oscillating process. M and M' represent the oscillating centers of the additional masses 2 and 2' proper which in view of their great distance from the oscillation axis Zo assumed to have a small amplitude are located only slightly above their centers of gravity. The oscillating centers of each fork arm forming the resultant of the oscillating centers of the fork arms 1, 1' and the additional masses 2, 2' have likewise been shown in FIG. 1 and are located at $\psi$ or $\psi'$.

If the two fork arms carry out a counterphase oscillation in the direction $x$, on one hand reaction forces occur which extend in the $y$-direction and which have twice the frequency of the induced oscillation. A calculation will show that with an oscillator having the illustrated dimensions and with a frequency of 100 Hertz and an oscillating amplitude of the additional masses of approximately 0.5 millimeters, these reaction forces will remain still negligibly small. Nonnegligible, however, are the torques occurring about the $y$-axis which torques are conveyed to the support 7 through the connection between the foot 3 and the holding member 4.

According to the invention, these torques can be reduced to zero when the two additional masses 2 and 2' are so located with regard to the main plane of symmetry $x, y$ as is diagrammatically shown in FIG. 3. The oscillating centers of the additional masses 2 and 2' are located on the opposite side of the $x$ and $y$ plane of symmetry as is also the case with the centers of gravity $m$, $m'$ of the pertaining spring arms 1, 1'. The distance of the oscillating centers M, M' from the plane of symmetry is with a given magnitude of the additional masses so selected that the torques exerted by the fork arms and the $y$-axis with each oscillating fork are just compensated for by the torques exerted by the additional mass about the $y$-axis. The resultant oscillating center $\Phi$, $\Phi'$ of each fork arm including the additional mass thus coincide in one point along the $x,y$-plane of symmetry. With this design of the frequency standard, the torques produced by the two fork arms are composed only of the torques which are exerted in opposite direction about the Zo-axis, said torques being absorbed by the fork foot 3.

FIGS. 4 to 6 illustrate a concrete solution for the design and arrangement of the additional masses at the ends of the fork arms of a two-arm fork oscillator. Each additional mass consists in this instance of a cylindrical body 8, 8' which has one end face connected to a connecting member 9, 9'. The connecting member is so shaped that it will not interfere with the counterphase oscillating movement of the two fork ends and is by spot welding connected to a foot portion 10, 10' of the pertaining fork arm.

As illustrated in FIG. 4, the cylindrical bodies 8, 8' have their free ends protrude somewhat further beyond the y,Z-plane of symmetry whereby a compensation for the mass of the connecting members 9, 9' is obtained. Thus, the oscillator will also with regard to the y,Z-plane have a symmetrical distribution of the masses.

With the embodiment illustrated in FIGS. 7 and 8, the additional mass of the fork arm 1 consists of a sheet metal form part 11 of soft iron which is connected particularly by spot welding with a foot portion 12 to the end of the fork arm 1. In the center of this sheet metal form part 11 there is connected a cylindrical permanent magnet 13, preferably by cementing. The sheet metal form part 11 has rectangularly bent thereto three ears 14 which are parallel to the axis of the cylindrical permanent magnet 13 and which serve as field short circuit (Feldruckschluss). The permanent magnet 13 protrudes in part into a coil connected to a stationary holder 15. This coil comprises a control winding 16 and a working winding 17. The winding 16 is located in the base-emitter-circuit, and the working winding 17 is in series with a battery 19 of the emitter-collector-circuit of a transistor 18. The fork arm 1 can thus by means of its head be induced to carry out an undamped bending oscillation.

FIGS. 7 and 8 will indicate that the inertia or oscillating center M of this head is located in the y,Z-plane of the oscillator but is located on the other side of the x,y-plane of symmetry than the oscillating center m of the pertaining fork arm 1.

The second fork arm 1' is provided with a sheet metal form part 20, preferably of brass, which surrounds the head 11, 13, 14 and which likewise by spot welding is connected with one foot part 21 to the end of the fork arm 1'. This part 20 has two legs 22 and 23 which are bent off at a right angle. Of these legs, the leg 22 is larger than the leg 23 and also has a greater distance from the x,y-plane of symmetry than the leg 23. The dimensions of this second head are so selected that the second spring arm 1' together with its head has the same duration of oscillation as the spring arm 1. The center of oscillation M' of this head will also with this oscillating arm be located in the 4,Z-plane and at such a distance from the y-axis that the torque exerted by the mass m' about the y-axis is just compensated for by the torque exerted by the additional mass M' about the y-axis.

The buildup of the frequency standard illustrated in FIGS. 7 and 8 is shown more clearly in FIG. 9 in which the coil provided for driving the frequency standard is pulled out of the head 11 to 14 in upward direction, and the second which surrounds the head 11 to 14 is illustrated as being offset downwardly with regard to the corresponding fork arm 1'.

According to FIG. 9, a soft iron yoke 24 is connected to the back side of the sheet metal part 20. This soft iron yoke 24 is provided with two coaxially arranged permanent magnetic bars 25 which are directed in the same direction and which at their free ends face each other at a slight distance with opposite poles. In the gap between the two magnetic bars 25 there is provided a so-called Cliffors wheel 26 of soft iron which is adapted to rotate about an axis 27.

When the wheel 26 rotates synchronously with regard to the oscillating movement of the fork oscillator, the said wheel may be maintained in its rotary movement by the oscillator. Connected to the wheel 26 or the shaft 27 is an indicating mechanism in a manner known per se.

With the mass equalization to be effected with regard to the two fork arms with their heads, it is, of course, necessary also to take into consideration the mass of the structural elements comprising the yoke 24 and the magnetic bars 25. Expediently, the wheel 26 is located in the x,y-plane of symmetry of the oscillator or at least in the vicinity thereof.

In order to be able, for instance, with the embodiment illustrated in FIG. 9 to meet the symmetry condition explained in connection with FIG. 3, the following procedure may be adopted: The oscillating fork which consists of a sheet metal stamping is produced completely symmetrically with regard to the x,y-plane. The head employed for initiating the oscillation and consisting of the elements 11, 12, 13 and 14 will be given a shape according to which the center of gravity will after the welding operation be located on the fork arm 1 in the y,Z-plane. A corresponding position is to be given to the second head composed of the elements 20, 21, 22, 23, 24, 25. The masses of these two heads are furthermore with their centers equally spaced from the foot of the fork connected to the corresponding fork arm. This distance is fixed in order to obtain a predetermined precise frequency. When installing the two heads on the fork arms, additional care is to be taken to the effect that the centers of gravity of the two heads are welded thereto in their theoretically correct position.

With such a design of the oscillator, the oscillating centers $\Phi$ and $\Phi'$ of the two partial oscillators will with the oscillator at rest coincide in a point of the x,y-plane and will when the oscillation is initiated move in opposite directions on a slightly curved path in the x,y-plane. The two fork arms 1 and 1' will in this connection be subjected only to bending stresses. In the foot 3 of the fork there will occur torsion stresses which originate from the two fork arms and which compensate each other. Torsion stresses in the fork foot about the y-axis compensating each other and not compensating each other do not occur with this design of the oscillator.

FIGS. 10, 11 and 12 respectively illustrate in three views arranged perpendicularly to each other and partially in section an embodiment which is similar to that shown in FIGS. 7 to 9. The embodiment of FIGS. 10, 11 and 12 differs from that of FIGS. 7 to 9 primarily in that the fork arm 1 has connected thereto a head forming an additional mass. The said head serves for initiating oscillations and also serves for advancing an indicating mechanism, whereas the fork arm 1' is provided with one additional mass only.

For purposes of inducing oscillations, also in this instance there are provided a control or working coil 16, 17 which is firmly connected, for instance by cementing, to a stationary insulating structural member 15. The coils 16 and 17 are through a transistor amplifier coupled to each other as shown in FIGS. 8 and 9. Into these coils 16 and 17 there extends a cylindrical permanent magnet 13' which is coaxial with the coils and which is connected at an end face, for instance by cementing, to the sheet metal part 11' consisting of soft iron. Arranged on the sheet metal part 11' and in the same plane there is a foot section 12' by means of which the sheet metal part 11' is connected, for instance by spot welding, to the free end of the fork arm 1.

The sheet metal part 11' also in this instance has three ears 14' which are bent off toward one side at a right angle and which extend from the outside over the coils 16 and 17 and form a field short circuit for the magnetic field produced by the permanent magnet 13'.

The part 11' furthermore comprises two additional ears 24' which are bent off at a right angle to the other side. Between the ends of the ears 24' there are connected two thin cylindrical magnets 25', for instance by cementing or pressing. These ears 24' are arranged coaxially with regard to each other and are separated from each other by a narrow airgap. The ends of the magnets 25' which define the airgap are tapering in the form of a frustrated cone with regard to the end face. The two magnets 25' are magnetized in the same direction. The ears 24' and the sheet metal part 11' form a field short circuit for the magnetic field of the two magnets 25'. In the airgap there is provided a strongly bundled magnetic field. Also in this instance this magnetic field extends through a driving wheel 26 for an indicating mechanism, said driving wheel consisting of soft iron and provided with teeth while being rotatable about a shaft 27.

The mass distribution of the head composed of the sheet metal parts 11', 14', 12' and 24' and the magnets 13' and 25' is also in this instance so selected with regard to the plane passing through the axes y, Z that the inertia or oscillation center M will with the oscillator at rest be located in this y,Z-plane. On the other hand, also in this instance, the inertia or oscillation center M of the head is located on the other side of the x,y-plane than the inertia or oscillation center M of the fork arm 1 and, more specifically, at such a distance from the x,y-plane that the torques produced by the fork arm 1 about the y-axis will just be compensated for by the torques produced by the head about the same axis.

The two fork arms 1 and 1' are also in this instance completely identical and are symmetrically located with regard to the x,y-plane. The additional mass connected to the fork arm 1' is with regard to its mass distribution likewise so selected that its inertia or oscillating center M' will be located in the y,Z-plane when the oscillator is at rest and with regard to the x,y-plane is so selected that the inertia or oscillating center M' will be located on the other side of the x,y-plane than the inertia or oscillating center m' of the fork arm 1'. With the illustrated embodiment, the additional mass of the fork arm 1' consists of a U-shaped sheet metal part 22', 28, 23' which is located upright with regard to the direction of oscillation and which is connected preferably by spot welding at the end of the fork arm 1' to an angled-off foot portion 21'. The foot portion 21' is in this instance located on the opposite side of the y,Z-plane with regard to the foot portion 12 of the sheet metal part 11', 14', 24'. For this additional mass it is necessary to select a nonferromagnetic sheet metal part, for instance a brass sheet, in order to avoid induction or reciprocal action with the magnetic fields of the other hand or of the driving and control coil. The upright or on edge position of the sheet metal parts 22', 28 and 23' in the direction of oscillation will result in a particularly low air damping of this free oscillator arm. The legs 22' and 23' which are located at both sides near the head connected to the fork arm 1 are with this embodiment equally spaced from the x,y-plane. However, the leg 22' is somewhat longer than the leg 23'. This additional mass on the other side of the x,y-plane will during the oscillating operation just compensate for the torques exerted by the fork arm 1' about the y-axis.

Another solution could consist in designing the leg 22' identical to the leg 23' but arranging the leg 22' at a greater distance from the y-axis than the leg 23'.

The fork foot 3 which connects the fork arms 1, 1' is also in this instance by round notches 5 partially separated from the holding extension 4'. The holding extension 4' has two bores arranged adjacent to each other by means of which, together with screws 6, the oscillator is connected to the support 7.

The operation of the mechanical oscillator in FIGS. 10—12 is very similar to that illustrated in FIG. 9 with the difference that in this instance the second partial oscillator is adapted to oscillate completely freely and under no load.

An optimum oscillator will also in this instance be obtained when employing the symmetry conditions set forth in connection with FIGS. 3 and 9. Expediently, also in this instance the magnets 23' and 25' provided for the excitation and advancement are located symmetrically with regard to the x,y-plane. However, they may also without any material drawbacks together be offset slightly in the direction of the Z-axis.

As will be seen from the above, the present invention is characterized by the following advantages: For a preselected frequency of the oscillator, dimensions of the fork arms including their foot portion on one hand and the additional masses on the other hand can be selected independently of each other. When the two fork arms are of the same and symmetrical design, it is merely necessary to select the two additional masses of the same magnitude and to design the same so nonsymmetrical that after being connected to the pertaining fork arm, the required condition of symmetry with regard to the intersection of the two planes will be met.

With the oscillator design according to the invention, it is not necessary to have reinforcements at the ends of the fork arms nor at the foot of the fork so that the oscillator fork which substantially absorbs the potential energy of the oscillator can together with the connecting part therefor be produced as a single piece stamping from a material of lower self-damping. This considerably simplifies the production and improves the properties of this part of the mechanical oscillator. In this connection it is possible so to disengage the foot portion interconnecting the two fork arms by lateral preferably symmetrical notches from a holding member to be connected directly to the fork and intended for connecting the oscillator that only a small amount of oscillating energy will be transferred from the oscillator to the support.

It is, of course, to be understood that the present invention is, by no means, limited to the particular embodiments shown in the drawings but also comprises any modifications within the scope of the appended claims:

What I claim is:

1. A mechanical oscillator adapted for use in time-keeping devices comprising: a pair of parallel adjacent flat resilient arms free of each other at one end, a connecting element integral with said arms and joining said arms together at the other end, said arms being coplanar in a first plane and being symmetrically disposed on opposite sides of a second plane disposed midway therebetween and perpendicular to said first plane, mass elements on the free ends of said arms, said arms and the mass elements thereon forming a pair of substantially identical partial oscillators adapted to oscillate in respectively opposite phase in the direction perpendicular to said first plane and at one and the same frequency whereby the oscillation centers of said arms and said mass elements lie in said first plane during resting of oscillation and at least one of said mass elements has a hollow shape relative to its oscillation center, said other mass element being freely movable into the hollow shape in oscillation direction, each said mass element having the center of oscillation thereof so disposed on the opposite side of said second plane from the center of oscillation of the respective arm that the torque exerted by each arm about the line of intersection of said first and second planes is compensated by the torque exerted by the respective mass element about said line when the arm members and mass elements oscillate.

2. A mechanical oscillator adapted for use in time-keeping devices comprising: a pair of parallel adjacent flat resilient arms free of each other at one end, a connecting element integral with said arms and joining said arms together at the other end, said arms being coplanar in a first plane and being symmetrically disposed on opposite sides of a second plane disposed midway therebetween and perpendicular to said first plane, mass elements on the free ends of said arms, said arms and the mass elements thereon forming a pair of substantially identical partial oscillators adapted to oscillate in a respectively opposite phase in a direction perpendicular to said first plane and at one and the same frequency, each said mass element having the center of oscillation thereof so disposed on the opposite side of said second plane from the center of oscillation of the respective arm that the torque exerted by each arm about the line of intersection of said first and second planes is compensated by the torque exerted by the respective mass element about said line when the arm members and mass element oscillate, first means at the free ends of said arms for maintaining said arms in oscillation and second means at the free ends of said arms for imparting driving force to a driver element, said first means including first permanent magnet means connected to the free end of one of said arms, said second means comprising second permanent magnet means connected to the free end of one of said arms on the other side of the oscillator, said permanent magnet means establishing a magnetic field transverse to the direction of oscillation of said arms, each of said first and second permanent magnet means being mounted on a sheet metal part of ferromagnetic material shaped to form a return path for the magnetic field thereof, said sheet metal parts forming at least a portion of the mass elements for said arms, said first magnet means being cylindrical with its axis extending in the direction of oscillation of said arms, said second magnet means being in the form of spaced magnet elements adapted to receive the driven element therebetween.

3. A mechanical oscillator according to claim 2, in which said spaced magnet elements taper inwardly toward each other at their adjacent ends.

4. A mechanical oscillator according to claim 2, in which both of said permanent magnet means are mounted on the free end of a single one of said arms.

5. A mechanical oscillator according to claim 2, in which said first and second permanent magnet means are mounted on respective ones of said arms.

6. A mechanical oscillator according to claim 4, in which the mass element for the other of said arms is in the form of a sheet metal part of nonferromagnetic material.

7. A mechanical oscillator according to claim 6, in which said sheet metal part of nonferromagnetic material is substantially U-shaped with the legs thereof extending in the direction of oscillation of the arms, the said leg on the opposite side of said second plane from the respective arm being heavier than the other one of said legs.